Feb. 4, 1930.　　　　I. G. PERRETT　　　　1,745,707
VALVE CONTROLLING MECHANISM
Filed Nov. 17, 1927　　　3 Sheets-Sheet 1

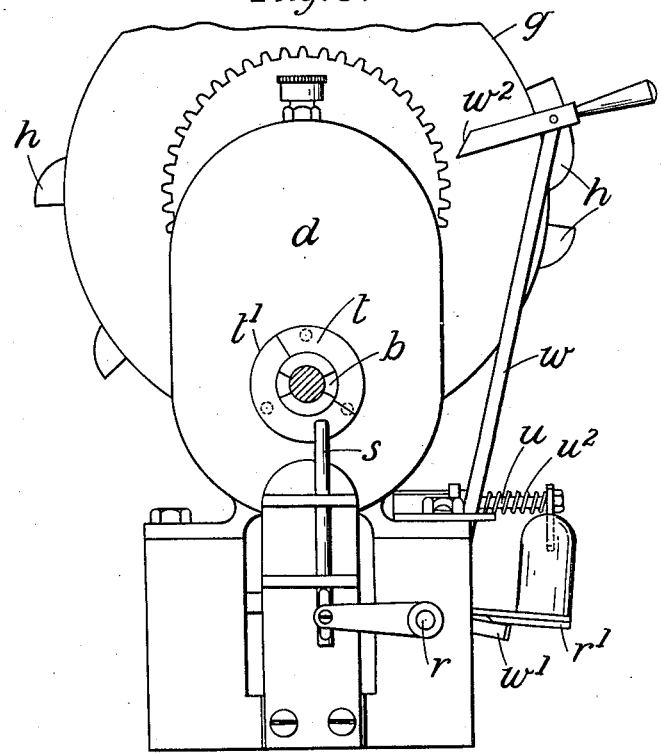
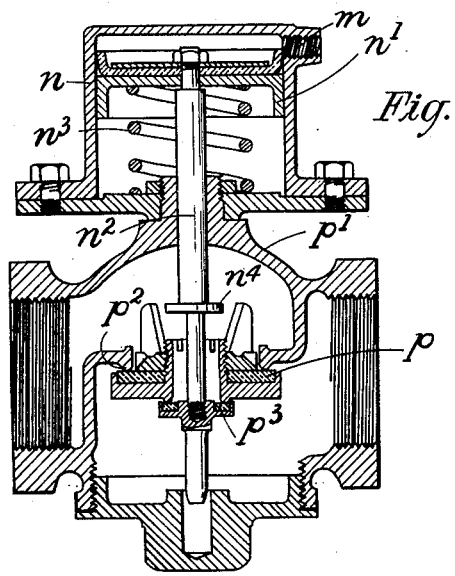

Patented Feb. 4, 1930

1,745,707

UNITED STATES PATENT OFFICE

IVOR GWYNNE PERRETT, OF OSTERLEY, ENGLAND

VALVE-CONTROLLING MECHANISM

Application filed November 17, 1927, Serial No. 233,940, and in Great Britain March 30, 1927.

This invention relates to valve controlling mechanism and has for its main object to provide an improved and automatic mechanism for controlling a plurality of valves according to a desired cycle of operations. The controlled valves may consist for example of the supply and drain valves for the cylinders of a rotary or other washing machine.

The invention has also for an object to provide a valve controlling mechanism in which not only can the periods of operation of the individual valves be adjusted as desired, but also the controlling element can be exchanged and replaced as a whole when it is desired to alter the cycle of operation of the several valves; the exchangeable time element is driven by readily disconnectible means, such as a pair of spur wheels, whereby the invention allows of varying the gear ratio so as to increase or decrease the duration of the cycle, the time of each operation being altered in equal proportions, by the substitution of different sized gears.

The invention has likewise for object to provide manual means whereby any one or more of the controlled valves may be operated independently of the automatic control if required, and also a cut-out device whereby the time element may be disconnected from the drive after a complete cycle of operations.

Other objects of the invention will appear from the subsequent description, wherein reference is made to the accompanying drawings, in which:—

Figure 6 is an end view of the controlling mechanism with the driving pulley removed and the cut-out device in the free position.

Figure 7 illustrates in sectional elevation the preferred form of supply valve with hydraulic operating cylinder.

Figure 1:
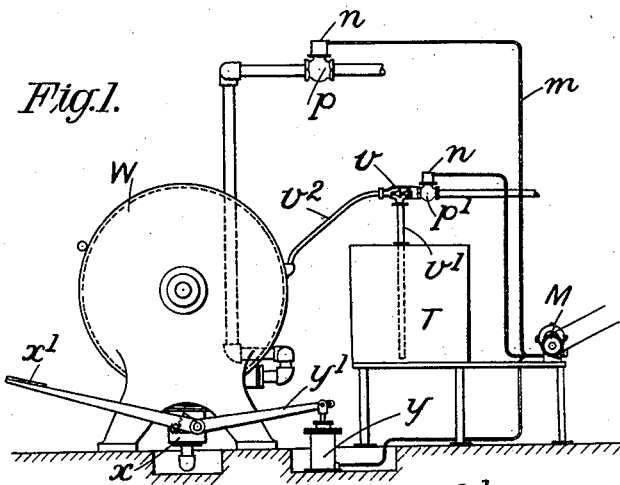
Figure 1 represents the application of the present invention to the automatic control of the supply and drain valves of a washing machine.

In applying the present invention, as illustrated in Figure 1, to the automatic control of the supply and drain valves of a washing machine, the supplies of hot and cold water, soap and other solutions, are controlled by valves $p$ and the drain for the washing machine is also controlled by a valve $x$, all these valves being actuated by fluid pressure by way of a pipe system $m$ from an automatic control mechanism M. All the control mechanisms for a number of washing or other machines can therefore be arranged at a central or convenient point, from which fluid pressure pipes $m$ of small size are led to the operating cylinders $n$ of the several valves $p$ controlled by the system.

Figure 2:
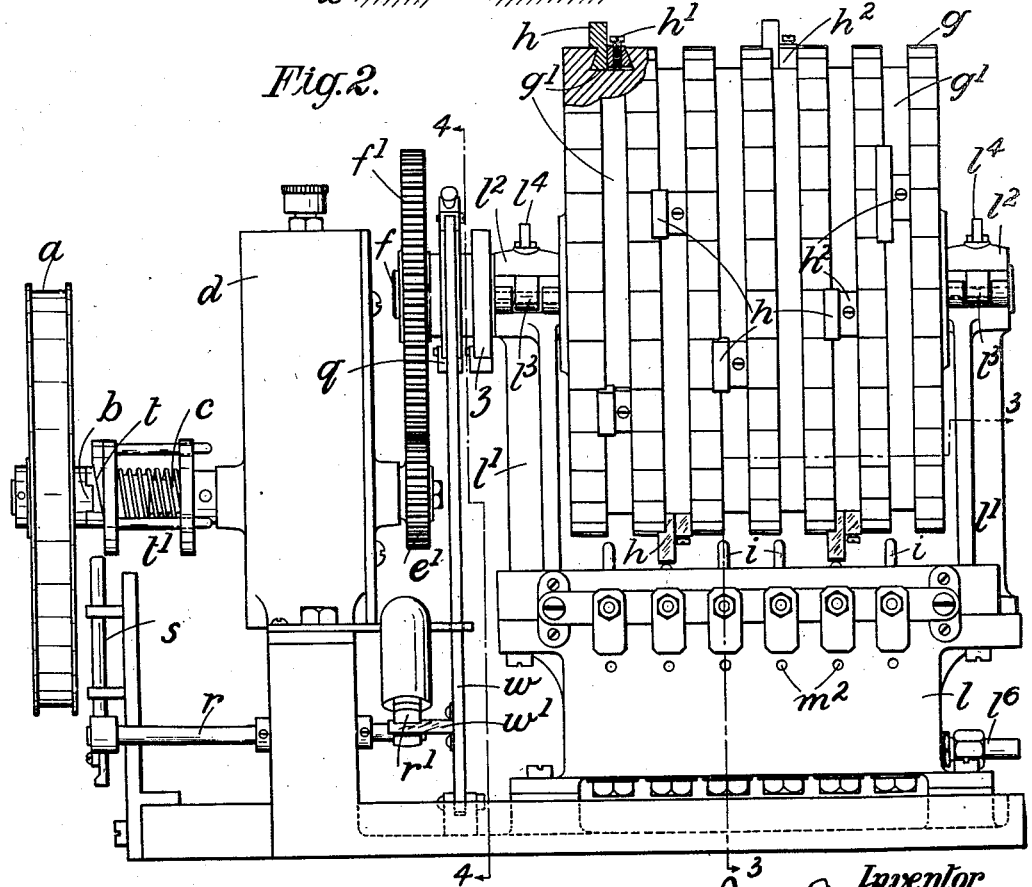
Figure 2 is an elevation of the improved controlling mechanism.

Referring to Figure 2, the controlling mechanism M is driven by a belt pully $a$ from any convenient source of power, this pulley being provided with a disconnectible clutch $b$ which drives the primary shaft $c$ of a reducing gear $d$ of large velocity ratio, the driven shaft $e$ of the gearing being connected by a detachable pinion $e^1$ to a spur wheel $f^1$ detachably secured upon the shaft $f$ of the controlling cam drum $g$, the latter rotating for example at a speed of one revolution per hour. The cam drum $g$ is formed with a number of circular grooves $g^1$ of dovetail section, adapted to receive the cam-pieces $h$ which are designed and set according to the desired length and sequence of the operations to be controlled. The cam-pieces $h$ are adjustable around the circumference of the grooved drum, being held in the adjusted position by screws $h^1$ and wedge blocks $h^2$, as shown in section at the top of Figure 2, so as to be replaceable by cam-pieces of different length if desired. The face of the drum is preferably scaled off in minutes or in fractions of a revolution to facilitate the setting of the cams.

Each cam is adapted to actuate, by means of a tappet rod $i$, the stem of a relay valve working in one of a series of chambers provided within a cylinder block $l$ forming a junction box.

As illustrated in Figure 2, the controlling mechanism comprises six or other desired number of relay valves mounted in the junction box $l$, the frame of which comprises a pair of brackets $l^1$ supporting the cam shaft $f$ in such a way that the latter can readily be detached; the bearing caps $l^2$ may be hinged as shown at $l^3$ to facilitate the removal of the cam shaft, and normally held closed by wing nuts $l^4$.

Figure 3:
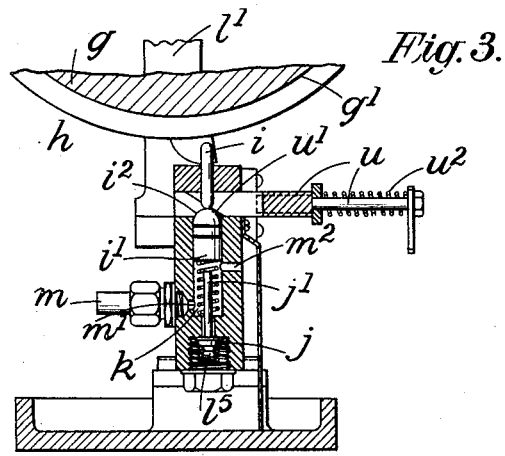
Figure 3 is a section on line 3—3 of Figure 2.

The relay valves $j$ (see Figure 3) are formed as spring-loaded disc valves, the stems $j^1$ of which are engaged by pistons or plungers $i^1$ working in the upper portions of the cylindrical chambers $k$, the plungers being normally held in the raised position by springs so that their upper ends $i^2$ project into engagement with the tappet rods $i$. There are also provided in the cylinder block, and in line with the several tappet rods and plungers, a number of suitably guided push rods or pallets $u$ with bevelled or wedge shaped ends $u^1$ which can be advanced by hand so as to depress the respective plungers independently of the cam drum; the bevelled end of each pallet $u$ is forked to clear the tappet rod $i$ while maintaining the plunger $i^1$ depressed. Thus any relay valve can be actuated by hand by pushing in the corresponding pallet $u$ against the action of a spring $u^2$, in order to open the respective supply or drain valve, irrespective of the rotation of the cam shaft.

The portions of the chambers $k$ below the relay valves are connected by a common admission passage $l^5$ in the base of the cylinder block $l$ to the supply pipe $l^6$ for the water or other operating fluid; the upper portion of each chamber has an outlet port $m^1$ normally shut off from the admission and in free communication with an exhaust or drain port $m^2$. When the relay valve is actuated, either by the respective cam and tappet or by hand, the pressure fluid passes through the outlet port $m$ to the operating cylinder $n$ of the supply or drain valve.

The preferred construction of the supply valve is illustrated in Figure 7, where the valve casing $p^1$ provided with inlet and outlet branches at opposite sides and an internal dividing wall which forms a seating for the main valve $p$ is surmounted by a vertical cylinder $n$ containing a ram piston $n^1$. Water or other pressure fluid can be admitted to the top of the cylinder by means of the pipe $m$ extending from the outlet of the corresponding relay valve, which in the off-position connects this end of the cylinder to exhaust. The ram piston $n^1$ is secured to the upper end of a valve stem $n^2$ extending freely down through the main valve, and is normally raised by a coiled spring $n^3$. The cap $p^2$ of the main valve has a raised lip which forms a seating for a pilot valve $p^3$ fixed upon the valve stem $n^2$, the extremity of which is guided by a cylindrical socket $p^4$ in the cover plate. Above the main valve, the valve stem $n^2$ is fitted with a collar $n^4$ forming a stop, which is adapted to engage the notched upper end of the hollow boss at the centre of the main valve, so as to lift the latter from its seating after the pilot valve $p^3$ has first been raised, in order to equalize the pressure in the known manner.

It will be noted that by reason of the small size of the pilot valve $p^3$ in comparison with that of the ram piston $n^1$, the latter is enabled to control the valve even though operated by the same fluid pressure as that acting on the main valve.

It is found that the valve and piping supplying soap solutions and the like to washing machines are liable to become clogged owing to the settlement or jellification of the solution, especially during periods of non-working, the start of the supply being thereby delayed. This difficulty is avoided by providing for the supply to take place through a steam ejector or the like by way of vertical or sloping pipes which empty themselves automatically as soon as the ejector is turned off; the restart then takes place practically without delay, as soon as the controlling valve of the ejector is operated, the solution being lifted from its supply tank into the ejector nozzle and delivered thence down a descending pipe to the point of utilization. The supply valve $p$, operated by the ram piston, may for example be arranged as illustrated in Figure 1, so as to control the flow of steam to an ejector $v$ which acts to lift the liquid through a vertical pipe $v^1$ from a tank or reservoir T and to deliver it through a downwardly sloping pipe $v^2$ to the washing drum W or the like, instead of controlling the flow of liquid directly through a self-closing valve or cock opened by the operating cylinder.

Figure 4:
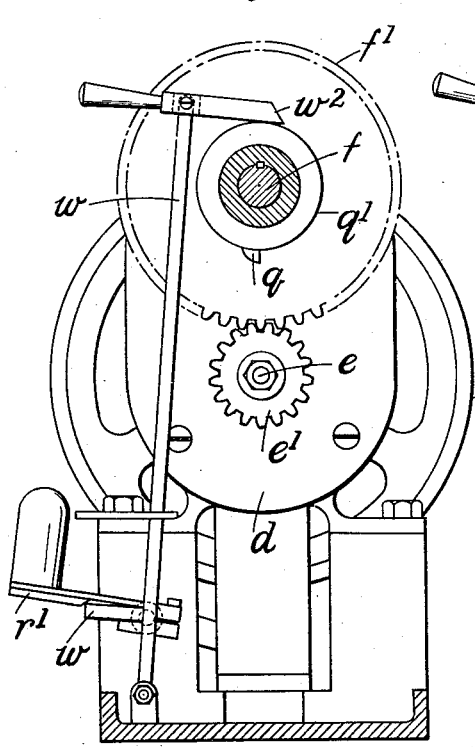
Figure 4 is a section on line 4—4 of Figure 2.
Figure 5:
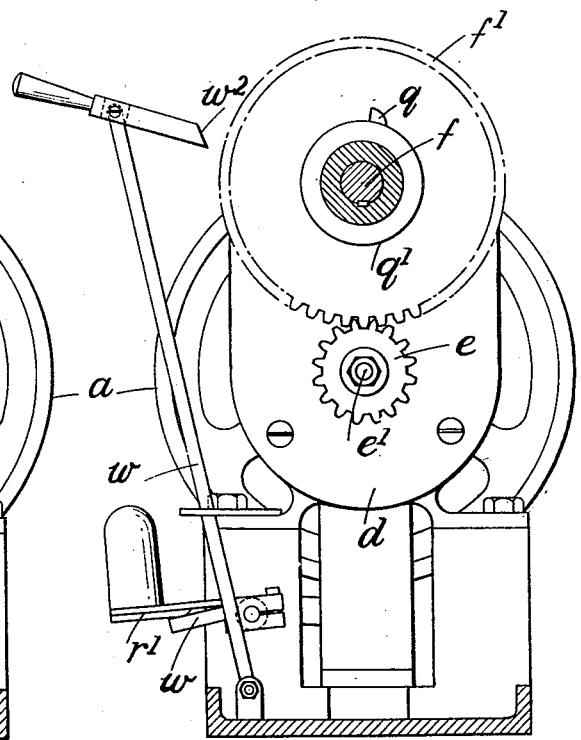
Figure 5 is a view similar to Figure 4, but showing the cut-out device in the free position.

The improved cut out device, see Figures 4, 5 and 6, comprises a striker tooth $q$ mounted upon a ring $q^1$ on the rotating cam shaft $f$, a vertically slidable rod $s$ adapted to be raised into the path of a cam $t$ upon a collar $t^1$ controlling the driving clutch or coupling $b$, and a shaft $r$ carrying a counter-weighted lever $r^1$ and tending to lift the rod $s$, the weighted end of this lever $r^1$ being normally held up by a projection $w^1$ upon a tripping lever $w$ pivoted at its lower end and having at its upper end a pawl $w^2$ which can be lowered into the path of the tooth $q$ on the cam shaft. When the cut out device is to operate, the tripping lever $w$ is advanced towards the cam shaft and its pawl allowed to rest on the rotating ring $q^1$, as seen in Figure 4, so that as the revolving cam shaft brings the tooth $q$ into engagement with the pawl $w^2$, the tripping lever $w$ is pushed back beyond its vertical position, the supporting projection being thereby withdrawn from the counterweight, as seen in Figure 5; the weighted lever $r^1$ therefore raises the rod $s$, as seen in Figure 6, into the path of the cam $t$, which acts to disconnect the coupling by displacing the collar $t^1$ axially and drawing the coupling jaws out of engagement, this taking place at the next revolution of the continuously running pulley $a$ or other driving member, after the tripping of the lever $w$.

The drain valve $x$ of the washing drum is usually operated by a weighted or spring controlled treadle $x^1$. In Figure 1, there is illustrated a hydraulic cylinder $y$ having its piston rod connected to a lever arm $y^1$ upon the operating spindle of the drain valve, this cylinder being controlled through the pipe $m$ by the respective relay valve as already described.

An electric contact device may be provided upon the rotary time element as indicated at $z$ in Figure 1, in order to give warning of the completion of a cycle of operations by ringing a bell, lighting a signal lamp or the like.

It will be obvious that the present invention enables the control mechanism to be readily altered to adapt the washing or like machine to any given class of work, by exchanging the cam drum $g$ for another similar drum having the cam pieces set at different relative positions or of different lengths, that cam drums having fewer than the regular number of grooves in operation may be employed when one or more of the relay valves is or are to remain out of action; further that in a laundry having a large number of washing or like machines, the number of replacement cam drums required will be relatively small, since it will not be necessary to change over the whole of the machines to the same class of work simultaneously; and that should the working conditions vary, the duration of the complete cycle of operations can be adjusted by altering the speed of the cam drum, either by exchanging the belt pulley or by altering the ratio of the gearing.

It will also be clear that instead of employing a cylindrical drum as time element, there may be substituted a sector-shaped element, or even a flat plate, provided with suitable cams, the driven shaft $e$ in this case engaging with the time element by means of a pinion and quadrant, pinion and rack, screw and nut or other well-known devices.

Having thus described my invention, what I claim is:—

1. A valve controlling mechanism, comprising a cam-fitted time element, a plurality of tappets engageable by the cams of said element, a plurality of relay valves, each of said relay valves having a plunger depressed by the respective tappet upon engagement of the respective cam on said time element, manual means for actuating a relay valve independently of said time element, said manual means including a forked pallet displaceable astride the respective tappet, said pallet being of wedge form and adapted to depress the plunger of the respective relay valve, and operating cylinders for the controlled valves, each operating cylinder being supplied with pressure fluid through the respective relay valve.

2. In a valve controlling mechanism, comprising a time element, relay valves actuated by said time element, and means for opening the controlled valves by pressure fluid supplied through said relay valves, the combination of a casing, a controlled valve within said casing, a pilot valve seating itself upon said controlled valve, an operating cylinder surmounting said casing, a piston within said cylinder, a stem connecting said piston to said pilot valve, and a spring arranged within said cylinder, said spring tending to cause said piston to close said pilot valve and said controlled valve, the pressure fluid supplied through said relay valve acting upon said piston to open said pilot valve, and said spring causing said piston to exhaust said fluid through said relay valve in the position of said relay valve for closing said controlled valve.

3. In a valve controlling mechanism, comprising a time element, relay valves actuated by said time element, and means for operating the controlled valves by pressure fluid supplied through said relay valves, the combination of a receiver for viscous liquid, a steam ejector supplied with steam through one of the valves controlled by said time element, a riser pipe leading to said steam ejector and lifting liquid from said receiver, and a down-comer pipe leading from said steam ejector and delivering said liquid to the point of utilization.

4. In a valve controlling mechanism, comprising a time element, relay valves actuated by said time element, means for operating the controlled valves by pressure fluid supplied through said relay valves, and means for driving said time element, said driving means including high speed and low speed members, the combination of a cut-out device adapted to disconnect said driving means after the completion of a cycle of operations controlled by said time element, said cut-out device including a striker carried by said low speed member, a disconnectible clutch upon said high speed member, a weighted lever controlling said clutch, and a tripping lever normally holding up said weighted lever, said tripping lever being displaced by the engagement of said striker at the completion of a cycle of operations controlled by said time element.

5. A controlling mechanism for pressure operated valves, comprising a grooved drum, cam-pieces mounted upon said drum, a shaft supporting said drum, bearing brackets for said shaft, a chambered block forming a base for said brackets, said block including a series of upper cylindrical chambers and a series of lower chambers, said lower chambers being in communication with a source of pressure fluid, a poppet valve controlling the flow of pressure fluid from each of said lower chambers to the corresponding upper chamber, a plunger in each of said upper chambers, said plunger controlling a drain port and also adapted to open the poppet valve to establish communication with the corresponding lower chamber, a cover plate upon said block, tappet rods slidable in said cover plate, each of said tappet rods bearing upon the upper end of one of said plungers and, being engageable by the corresponding cam piece upon said drum, a series of pallets slidable transversely at the top of said chambered block, each of said pallets having a bevelled extremity adapted to engage the upper end of the respective plunger, said bevelled extremity being also forked to clear the respective tappet rod, disconnectible means for driving said shaft, and means for connecting said upper chambers to the respective operating means of the controlled valves.

6. A controlling mechanism for a plurality of valves, comprising a plurality of valve operating cylinders, a plurality of relay valves, each of said relay valves adapted to supply pressure fluid to one of said cylinders for the operation of the corresponding controlled valve, an exchangeable time element actuating said relay valves according to any desired cycle of operations of said controlled valves, disconnectible means for driving said time element, said disconnectible means adapted to cooperate with any selected time element, a coupling for said disconnectible driving means, and means for automatically disengaging said coupling at the completion of a cycle of operations of said controlled valves, said automatic disengaging means comprising a striker mounted upon said time element, a counterweighted lever adapted to disengage said coupling and a tripping device for said counterweighted lever, said striker actuating said tripping device at the end of a cycle.

In testimony whereof I hereunto affix my signature.

IVOR GWYNNE PERRETT.